April 13, 1954   F. PORTAIL   2,675,490
DIRECT CURRENT FEED DEVICE FOR ELECTRIC APPARATUS
Filed June 2, 1950
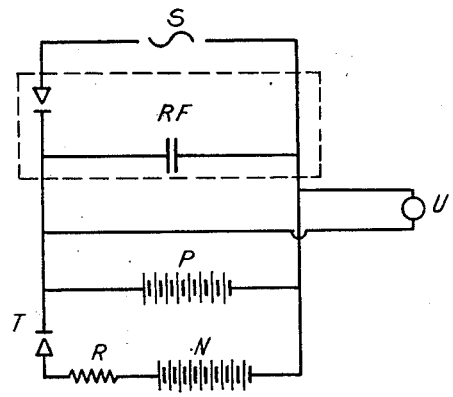
Inventor
Fernand Portail Patented Apr. 13, 1954

2,675,490

UNITED STATES PATENT OFFICE 2,675,490

DIRECT CURRENT FEED DEVICE FOR ELECTRIC APPARATUS

Fernand Portail, Paris, France, assignor to Compagnie Industrielle des Piles Electriques Cipel, Seine, France, a corporation under the laws of the French Republic Application June 2, 1950, Serial No. 165,792

Claims priority, application France June 28, 1949

3 Claims. (Cl. 307—48)

This invention relates to the supply of electric current to apparatus actuated from a source of direct current.

In a prior U. S. A. patent application, Serial No. 131,384, filed December 6, 1949, now Patent No. 2,594,988, issued April 29, 1952, for: "Primary Batteries," there was described a battery of primary cells essentially comprising the parallel combination of a large capacity battery and a battery characterized by low internal resistance.

It is the object of the present invention to provide for the use of such a battery in conjunction with an external source of direct or rectified current, in a manner generally similar to the use of so-called "buffer" secondary batteries.

It is known to connect a secondary battery across a source of direct current or a source of alternating current rectified by a suitable rectifier unit such as a valve, a copper oxide or selenium oxide rectifier, and the like. The secondary battery then fulfills a dual function. In the first place, it supplies the additional energy required to deal with peaks in the load current which the main supply equipment cannot take care of without causing an undue drop in voltage. Secondly, it serves as an emergency power supply source in the event of a breakdown of the main power supply.

Such an arrangement is very widely used, especially in the supply of signalling apparatus for railways and automatic or manual telephone exchanges. It is not free of shortcomings however. Its main drawback lies in the fact that the charge and discharge of the secondary battery are quite frequently substantially different from each other, a condition that requires the use of rectifiers having a sharply drooping characteristic when the supply involves rectified current, or the interposal of a comparatively high resistance in the circuit where the supply is a source of D.-C. In either case the resulting variations in the useful output voltage are often detrimental to the proper operation of the load apparatus to be supplied.

Furthermore, it is a matter of common experience that, especially where the supply is a source of rectified alternating current, adjustment is delicate to perform and frequent readjustments are necessary, especially each time there is a failure in the supply.

This invention overcomes the above drawbacks. It essentially consists of substituting for the conventional battery of accumulators the above mentioned parallel combination of a battery of primary generator cells having a large capacity ("feeder battery") with a battery of generator cells having a low internal resistance ("peak battery") as more particularly described in the above-mentioned prior application.

The external source of current is connected across the peak battery and satisfactory operation requires only that the supply voltage be no higher than the electro-motive force of the feeder battery and no lower than the normal operating voltage of the peak battery.

A one-way valve element may be interposed in the circuit from the peak battery to the feeder battery to prevent the flow of charging current into the feeder battery in case the external supply voltage were to exceed the electro-motive force of said feeder battery.

Where rectified current is used, the above arrangement makes it possible to use a rectifier whose characteristic droops only to a minimum degree, thus minimizing the voltage variations across the load apparatus, in overload conditions or in the event of a failure in the main source of supply, or of the main alternating source, for example in the case of telephone equipment, it is desirable to provide a filtering rectifier apparatus in order that the supply voltage should be reasonably constant.

The accompanying exemplary drawing illustrates a simplified circuit diagram of one embodiment of this invention, as applied to the instance where the supply involves rectified A.-C.

In the diagram, S designates the source of alternating power. RF is the filtering rectifier unit. N is the large capacity feeder battery. P is the peak battery having a low internal resistance. R is a resistance interposed between both primary batteries. U is the load apparatus. And T is a valve unit preventing the feeder battery from being charged by a rectifier.

It will be understood that the diagram shows but one satisfactory means for embodying the invention, and that many modifications and alterations may be made therein and departures from the details described, without exceeding the scope of the invention.

What I claim is:

1. In the supply of electrical apparatus with direct current, in combination, a source of direct current; an electrical load apparatus connected to said source; a feeder primary battery having a high capacity; a peak primary battery having a low internal resistance, said feeder battery and said peak battery being connected in parallel across said source and across said apparatus; and a one-way valve means interposed between said batteries, whereby said batteries serve as a buffer generator arrangement for the current delivered by said source to said apparatus.

2. In the supply of electrical apparatus with direct current, in combination, a source of direct current; an electrical load apparatus connected to said source; a feeder battery including primary cells having a large capacity; a peak battery including primary cells having a low internal resistance, said feeder battery and said peak battery being connected in parallel across said source and across said apparatus; and a one-way valve means interposed between said batteries, whereby said batteries serve as a buffer generator arrangement for the current delivered by said source to said apparatus.

3. In the supply of electrical apparatus with direct current, in combination, a source of direct current; an electrical load apparatus connected to said source; a feeder battery including primary cells having a large capacity and a voltage being at least equal to the output voltage of said source; a peak battery including primary cells having a low internal resistance and a normal operating voltage being maximally equal to the output voltage of said source, said feeder battery and said peak battery being connected in parallel across said source and across said apparatus; and a one-way valve means interposed between said batteries, whereby said batteries serve as a buffer generator arrangement for the current delivered by said source to said apparatus.

References Cited in the file of this patent

UNITED STATES PATENTS

| Number | Name | Date |
| --- | --- | --- |
| 968,896 | Thomas | Aug. 30, 1910 |
| 1,756,589 | Gilson | Apr. 29, 1930 |
| 2,594,988 | Portail | Apr. 29, 1952 |